US005400748A

United States Patent [19]

Batzill et al.

[11] Patent Number: 5,400,748

[45] Date of Patent: Mar. 28, 1995

[54] INTERNAL-COMBUSTION ENGINE WITH TWO ROWS OF CYLINDERS

[75] Inventors: Manfred Batzill, Neuhausen; Hans-Joachim Esch, Heimsheim; Winfried Distelrath, Stuttgart, all of Germany

[73] Assignee: Dr. Ing., h.c.f. Porsche AG, Weissach, Germany

[21] Appl. No.: 235,312

[22] Filed: Apr. 29, 1994

[30] Foreign Application Priority Data

Apr. 29, 1993 [DE] Germany .......................... 43 14 044.0

[51] Int. Cl.[6] .......................... F01L 1/04; F02B 25/22; F16F 15/36

[52] U.S. Cl. ................................ 123/90.31; 123/55.2; 123/192.1

[58] Field of Search .................... 123/90.31, 55.2, 55.5, 123/55.7, 192.1, 192.2; 74/603

[56] References Cited

U.S. PATENT DOCUMENTS 2,749,893 6/1956 Porsche et al. .................. 123/90.31
4,230,074 10/1980 Ichikawa et al. ................. 123/55 R
4,794,887 1/1989 Valentine ......................... 123/192.2
4,841,789 6/1989 Ochiai ............................ 123/90.31
5,014,655 5/1991 Ampferer ......................... 123/90.31
5,113,807 5/1992 Kobayashi ........................ 123/90.31
5,184,582 2/1993 Okui et al. ....................... 123/90.31

FOREIGN PATENT DOCUMENTS 0068336 1/1983 European Pat. Off. .
2565627 12/1985 France .
2628789 4/1989 France .
3916512 5/1990 Germany .

*Primary Examiner*—Willis R. Wolfe
*Assistant Examiner*—Weilun Lo
*Attorney, Agent, or Firm*—Evenson McKeown Edwards & Lenahan

[57] ABSTRACT

An internal combustion engine with two rows of cylinders with a V-angle of 180 degrees has a crankshaft provided with a flywheel, said crankshaft having a drive for a parallel intermediate shaft adjacent to the flywheel. One camshaft of each row of cylinders is driven respectively from the two ends of this intermediate shaft. The arrangement of the drive for the intermediate shaft near the flywheel avoids the transmission of rotary oscillations from the crankshaft to the intermediate shaft.

8 Claims, 2 Drawing Sheets

INTERNAL-COMBUSTION ENGINE WITH TWO ROWS OF CYLINDERS

BACKGROUND AND SUMMARY OF THE INVENTION

The invention relates to an internal combustion engine of the type including: two rows of cylinders, a crankshaft provided with a flywheel, at least one parallel intermediate shaft driven by this crankshaft, and at least one camshaft in a driving connection with the intermediate shaft per row of cylinders.

An internal combustion engine with V-shaped arrangement of the rows of cylinders is known from German Patent Document DE-39 16 512 Cl, in which a parallel intermediate shaft is driven by an end of the crankshaft opposite the flywheel shaft. This intermediate shaft in turn drives, at one end, the camshaft of one row of cylinders. Advantageously, the space resulting from the offset of the rows of cylinders with respect to one another is utilized by the camshaft drive located therein.

It is disadvantageous for the rotational oscillations occurring at the free end of the crankshaft opposite the flywheel side to be transmitted completely to the intermediate shaft and by the latter to the camshafts. Especially in the case of a camshaft driven by the end of the intermediate shaft of the flywheel end, the rotational oscillations of the intermediate shaft and the crankshaft can add up and negatively affect the control times so that the exhaust behavior and fuel consumption deteriorate as a result.

One proposal for solving this problem is disclosed in U.S. Pat. No. 4,230,074, whereby an intermediate shaft is driven by both ends of the crankshaft, said intermediate shaft then being connected in turn with a camshaft, said intermediate shaft then being connected in turn with a camshaft in a driving relationship. This arrangement is compact and drives at least one intermediate shaft from the end of the crankshaft at the flywheel side, while the other intermediate shaft is still exposed to the rotational oscillations of the crankshaft. In addition, this solution requires increased expenditure on components.

Hence, an object of the invention is to provide a two-row internal combustion engine with dimensions that are as compact as possible and a behavior which is optimized relative to the rotational oscillations that occur.

This object is achieved according to preferred embodiments of the invention by providing an arrangement with a first driving connection for a camshaft provided at an end area of the intermediate shaft away from the flywheel and a second driving connection for the other camshaft at an end area of the intermediate shaft near the flywheel, wherein the drive of the intermediate shaft is located in an end area of the crankshaft bearing the flywheel and wherein the intermediate shaft extends below the crankshaft in the installed position of the internal combustion engine.

When in an internal combustion engine of this type the intermediate shaft is driven by the end section of the crankshaft which bears the flywheel and is low in rotational oscillations, the rotational oscillations transmitted to the intermediate shaft can be disregarded. Consequently, the space-saving design of the two drive connections to the camshafts are not critical from the oscillation standpoint.

The preferred positioning of the intermediate shaft below the crankshaft offers good space utilization of the volume that is needed anyway for installing the oil strainer, oil pan, etc. Disposing it above the crankshaft would unfavorably limit the space urgently needed in the V between the rows of cylinders for mounting accessories. A V angle of 180 degrees would unnecessarily increase the height of the engine.

A symmetrical arrangement of the intermediate shaft below the crankshaft according to especially preferred embodiments constitutes the precondition for uniform driving behavior for the camshafts of both rows of cylinders.

The structural length of the internal combustion engine in the lengthwise direction of the crankshaft can be reduced further when the drive for the intermediate shaft is located between the second drive connection and the flywheel.

In one advantageous embodiment, a drive for two camshafts per row of cylinders can be produced when these two camshafts are connected together by a drive located roughly centrally along their lengthwise extent, e.g. by gears or chains. The length of the internal combustion engine therefore remains unaffected thereby, as does the overall arrangement of the drives.

In, addition, the arrangement according to the invention can also be used to drive an accessory, e.g. an oil pump. For this purpose, the end area of the intermediate shaft way from the flywheel has a rotary drive, for example in the form of a square pin, which engages an oil pump in driving fashion. There is no separate drive for oil pump.

The arrangement described above can be accomplished in the shortest distance in terms of length when, starting at the flywheel, the order is as follows: first the drive for the intermediate shaft, then the second driving connection for a camshaft, followed by the first driving connection for the other camshaft, and finally the rotary drive.

The drive for the intermediate shaft, the driving connections to the camshafts, and the drive located between adjacent camshafts are preferably formed of chains and gears.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
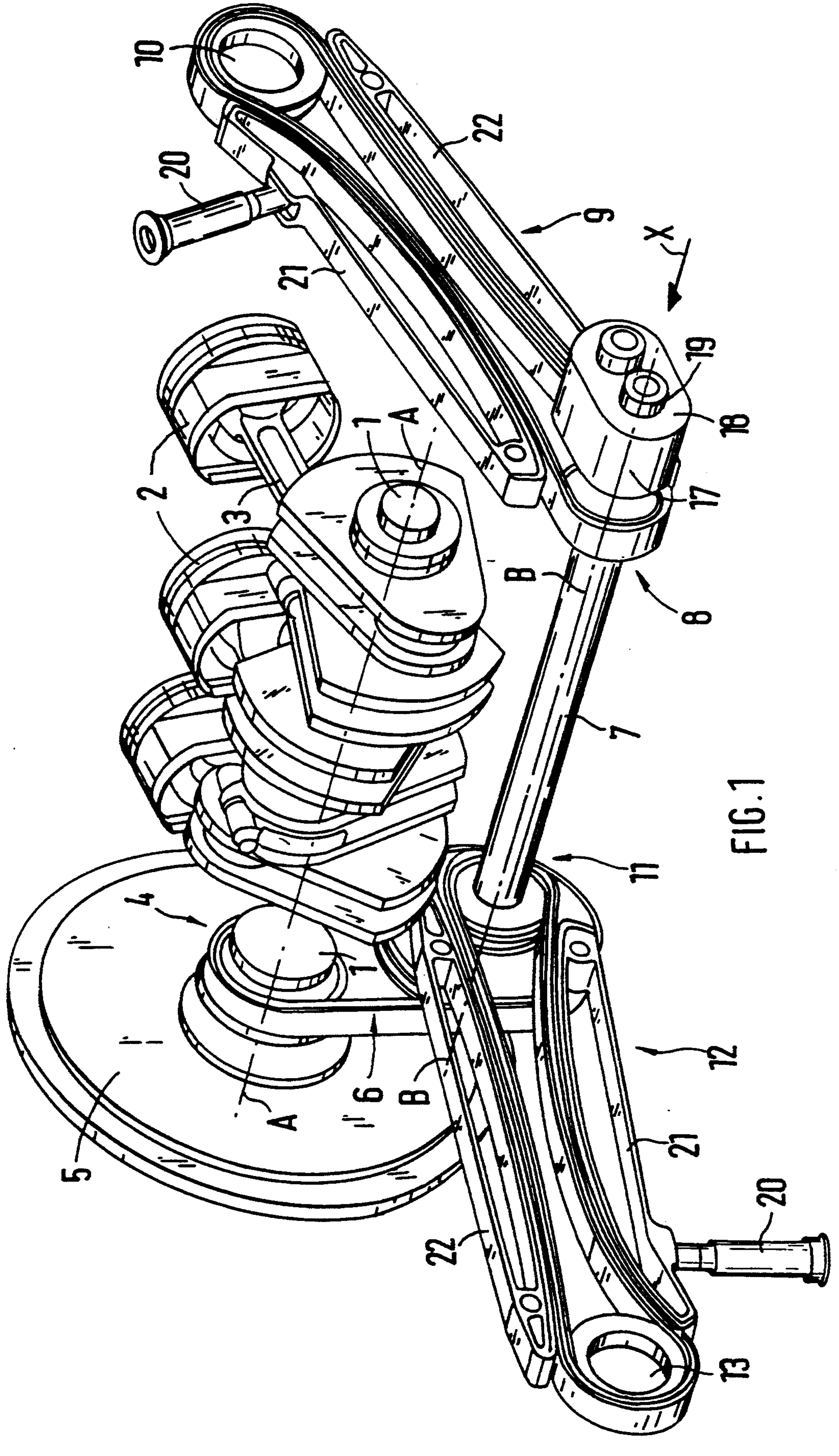
FIG. 1 is a schematic and perspective view of a crankshaft and intermediate shaft arrangement with the crank drive shown partially, constructed according to a preferred embodiment of the present invention.

An internal combustion engine has two rows of cylinders with a V-angle of 180 degrees. A crankshaft 1 is part of a crank drive. To clarify the invention, FIG. 1 shows piston 2 and connecting rod 3 for only row of cylinders.

Crankshaft 1 at an end section 4 bears a flywheel 5 and adjacent thereto a drive 6 for an intermediate shaft 7 extending below crankshaft 1 and parallel to its lengthwise axis A—A. This lengthwise axis A—A and the corresponding axis B—B of intermediate shaft 7 lie in a plane of symmetry E—E, with respect to which pistons 2 of the internal combustion move perpendicularly.

In an end area 8 of intermediate shaft 7 away from the flywheel, a first driving connection 9 for a camshaft 10 of one row of cylinders is provided.

Adjacent to drive 6, intermediate shaft 7 bears on its end are 11 close to the flywheel, a second driving connection 12 for a camshaft 13 of the other row of cylinders.

Figure 2:
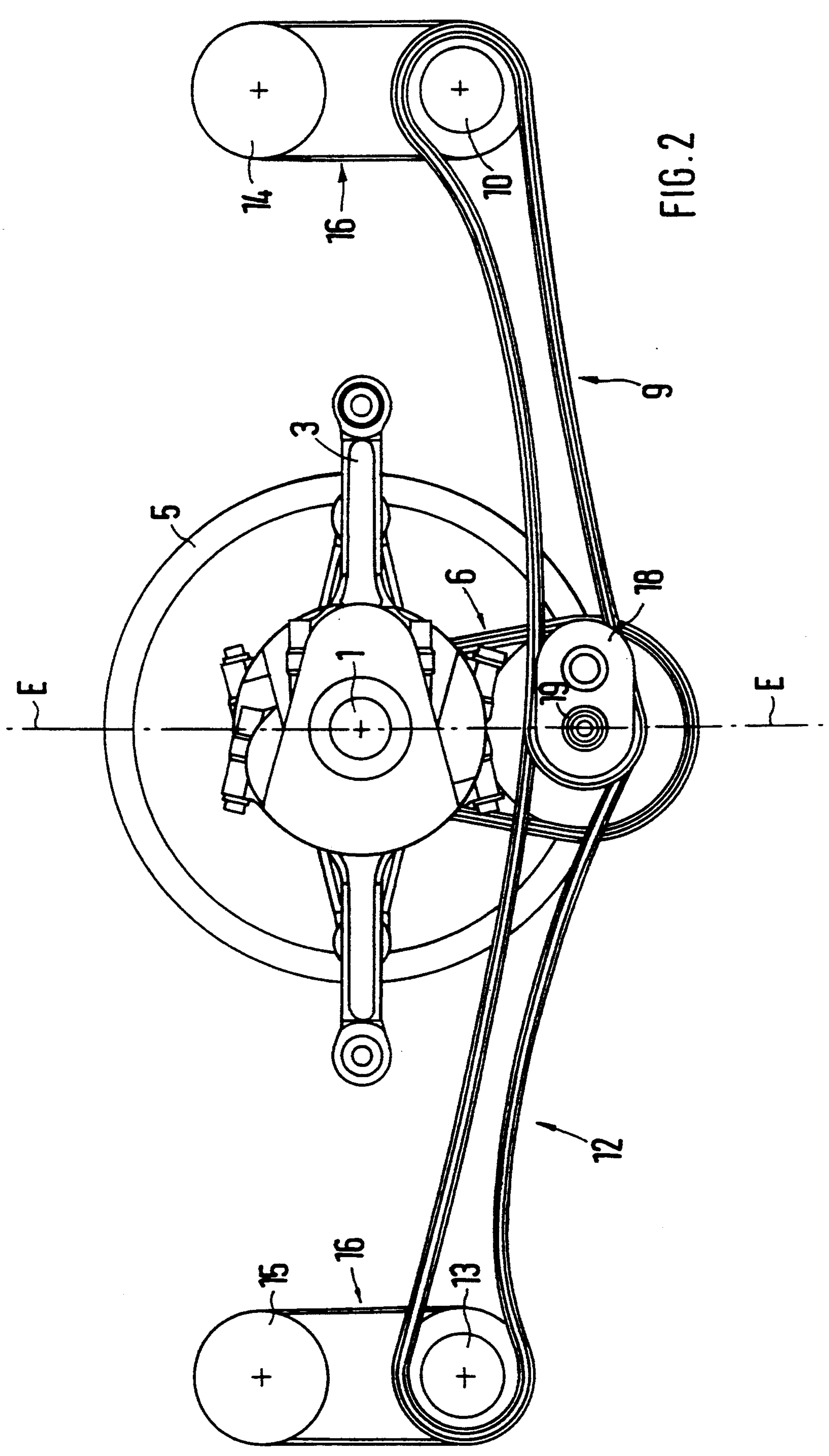
FIG. 2 is a view looking in the direction of arrow X in FIG. 1.

Each row of cylinders has a second camshaft 14, 15 (see FIG. 2) which, with interposition of a drive 16, is driven by the respective camshaft 10, 13. Drive 16 is arranged roughly centrally relative to the lengthwise extent, parallel to crankshaft 1, of camshafts 10, 13, 14, and 15.

The end area 8 of intermediate shaft 7 away from the flywheel bears a rotary drive 17 for an oil pump 18. This rotary drive 17 is made in the form of a positive plug-in connection in such manner that a shaft 19 of oil pump 18 lies coaxially with respect to lengthwise axis A—A. Driving connections 9 and 12 are provided on their upper run with a tensioning bar 21 tensioned by a hydraulic tensioner 20, and on their lower run with a sliding rail 22.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Internal combustion engine comprising:

two rows of cylinders, a crankshaft provided with a flywheel, at least one intermediate shaft being parallel to and driven by the crankshaft through a drive, at least one camshaft in a driving connection with the intermediate shaft per row of cylinders, and a first driving connection for a camshaft being provided at an end area of the intermediate shaft away from the flywheel and second driving connection for the other camshaft at an end area of the intermediate shaft near the flywheel, wherein the drive of the intermediate shaft is located in an end area of the crankshaft bearing the flywheel, and wherein the intermediate shaft extends below the crankshaft in the installed position of the internal combustion engine.

2. Internal combustion engine according to claim 1, wherein the intermediate shaft extends in a vertical plane of symmetry which contains a lengthwise axis of the crankshaft.

3. Internal combustion engine according to claim 1, wherein the drive of the intermediate shaft is located between the second driving connection and the flywheel.

4. Internal combustion engine according to claim 2, wherein the drive of the intermediate shaft is located between the second driving connection and the flywheel.

5. Internal combustion engine according to claim 1, wherein each row of cylinders has a second camshaft, which, with interposition of a drive is driven by the respective first camshaft, whereby said drive of the second camshaft is located roughly centrally relative to the lengthwise extent of the camshafts.

6. Internal combustion engine according to claim 1, wherein the end area of the intermediate shaft away from the flywheel has a rotary drive for an auxiliary.

7. Internal combustion engine according to claim 1, wherein the structures are located in the following order along the intermediate shaft: a rotary drive and adjacent thereto, the first driving connection, and, at a distance therefrom, the second driving connection, and finally the drive of the intermediate shaft.

8. Internal combustion engine according to claim 5, wherein the structures are located in the following order along the intermediate shaft: a rotary drive and adjacent thereto, the first driving connection, and, at a distance therefrom, the second driving connection, and finally the drive of the intermediate shaft.

* * * * *